(12) United States Patent
Elliott et al.

(10) Patent No.: US 9,157,614 B1
(45) Date of Patent: Oct. 13, 2015

(54) ISOLATING ALIGNMENT AND STRUCTURAL STRENGTH IN LED DISPLAY SYSTEMS

(71) Applicant: Barco, Inc., Duluth, GA (US)

(72) Inventors: Grant Arthur John Elliott, Tai Po (HK); Marcus Robert Patterson, Auckland (NZ)

(73) Assignee: Barco, Inc., Duluth, GA (US)

( * ) Notice: Subject to any disclaimer, the term of this patent is extended or adjusted under 35 U.S.C. 154(b) by 240 days.

(21) Appl. No.: 13/777,266

(22) Filed: Feb. 26, 2013

Related U.S. Application Data

(63) Continuation of application No. 12/424,338, filed on Apr. 15, 2009, now Pat. No. 8,384,616.

(60) Provisional application No. 61/045,230, filed on Apr. 15, 2008.

(51) Int. Cl.
| | |
|---|---|
| F21V 21/00 | (2006.01) |
| F21V 21/005 | (2006.01) |
| F21V 21/088 | (2006.01) |
| F21V 21/14 | (2006.01) |
| G06F 3/14 | (2006.01) |
| F21S 8/06 | (2006.01) |
| F21K 99/00 | (2010.01) |

(52) U.S. Cl.
CPC .......... *F21V 21/005* (2013.01); *F21V 21/088* (2013.01); *F21V 21/14* (2013.01); *F21K 9/30* (2013.01); *F21S 8/06* (2013.01); *G06F 3/1446* (2013.01)

(58) Field of Classification Search
CPC .......... F21S 2/005; F21S 8/06; F21V 21/00; F21V 21/088; F21V 21/14; F21K 9/30; G06F 3/1446

USPC .......... 362/249.01, 249.03, 249.06, 249.07, 362/249.14, 249.1
See application file for complete search history.

(56) References Cited

U.S. PATENT DOCUMENTS

| | | | |
|---|---|---|---|
| 4,209,934 A | 7/1980 | Ogawa | |
| 5,128,662 A | 7/1992 | Failla | |
| 5,410,328 A | 4/1995 | Yoksza et al. | |
| 5,424,931 A * | 6/1995 | Wheeler | 362/249.1 |
| 6,029,831 A | 2/2000 | Miller | |
| 6,065,854 A * | 5/2000 | West et al. | 362/249.06 |
| 6,252,564 B1 | 6/2001 | Albert et al. | |
| 6,314,669 B1 | 11/2001 | Tucker | |
| 6,498,592 B1 | 12/2002 | Matthies | |

(Continued)

FOREIGN PATENT DOCUMENTS

| | | |
|---|---|---|
| EP | 1365376 | 11/2003 |
| EP | 1524640 A2 | 4/2005 |

(Continued)

*Primary Examiner* — Y M Lee
(74) *Attorney, Agent, or Firm* — Aka Chan LLP

(57) ABSTRACT

A display system, a method of constructing a display system, and a method of displaying an image are provided. In one embodiment, a display system includes a support structure having a plurality of attachment members and a plurality of tiles. Each of the plurality of tiles is attached to a corresponding attachment member of the plurality of attachment members. The support structure is configured to structurally support each of the plurality of tiles, and at least one of the plurality of tiles includes at least one connection configured to removably connect and align the at least one of the plurality of tiles with another one of the plurality of tiles.

24 Claims, 4 Drawing Sheets

(56) References Cited

U.S. PATENT DOCUMENTS

| | | |
|---|---|---|
| 6,704,989 B1 | 3/2004 | Lutz et al. |
| 6,813,853 B1 | 11/2004 | Tucker |
| 7,063,449 B2 * | 6/2006 | Ward ............... 362/616 |
| 7,071,620 B2 | 7/2006 | Devos et al. |
| 7,102,601 B2 | 9/2006 | Devos et al. |
| 7,362,046 B2 | 4/2008 | Aston |
| 7,682,043 B2 * | 3/2010 | Malstrom et al. ....... 362/249.03 |
| 7,766,508 B2 | 8/2010 | Villard et al. |
| 8,007,121 B2 | 8/2011 | Elliott et al. |
| 2002/0003592 A1 | 1/2002 | Hett et al. |
| 2002/0097967 A1 | 7/2002 | Lowry |
| 2002/0154259 A1 | 10/2002 | Freidhoff et al. |
| 2002/0168157 A1 | 11/2002 | Walker et al. |
| 2003/0016227 A1 | 1/2003 | Matthies |
| 2005/0178034 A1 | 8/2005 | Schubert et al. |
| 2005/0225733 A1 | 10/2005 | Dwyer et al. |
| 2005/0278998 A1 | 12/2005 | Sawhney et al. |
| 2006/0044215 A1 | 3/2006 | Brody et al. |
| 2006/0290596 A1 | 12/2006 | Kweon et al. |
| 2007/0000849 A1 | 1/2007 | Lutz et al. |
| 2007/0252056 A1 | 11/2007 | Novin |
| 2008/0037284 A1 | 2/2008 | Rudisill |
| 2008/0278998 A1 | 11/2008 | Cowburn et al. |
| 2009/0034241 A1 | 2/2009 | Coushaine et al. |
| 2009/0310065 A1 | 12/2009 | Dunn |

FOREIGN PATENT DOCUMENTS

| | | |
|---|---|---|
| FR | 2797341 A1 | 2/2001 |
| JP | 8-314014 | 11/1996 |

* cited by examiner

ISOLATING ALIGNMENT AND STRUCTURAL STRENGTH IN LED DISPLAY SYSTEMS

CROSS-REFERENCE TO RELATED APPLICATIONS

This patent application is a continuation of U.S. patent application Ser. No. 12/424,338, filed Apr. 15, 2009, issued as U.S. Pat. No. 8,384,616 on Feb. 26, 2013, which claims priority to U.S. provisional application 61/045,230, filed Apr. 15, 2008, which are incorporated by reference.

This application is also related to U.S. patent application Ser. No. 12/424,360, filed Apr. 15, 2009, issued as U.S. Pat. No. 8,007,121 on Aug. 30, 2011, which is incorporated by reference.

BACKGROUND OF THE INVENTION

This disclosure generally relates to display units and particularly to a display system comprising groups of light emitting elements mounted to a support structure such that the display system may be easily installed and/or reconfigured while retaining both strength and positional accuracy.

Display systems for entertainment, architectural, and advertising purposes have commonly been constructed of numbers of light emitting elements such as LEDs or incandescent lamps mounted onto flat tiles. The light emitting elements can be selectively turned on and off to create patterns, graphics, and/or video displays for both informational and aesthetic purposes. It is well known to construct these displays as tiles or large panels which are assembled in position for a specific entertainment show or event or as an architectural or advertising display. Examples of such systems are disclosed in U.S. Pat. Nos. 6,813,853, 6,704,989, and 6,314,669, the disclosures of which are incorporated by reference herein for all purposes.

It can be a requirement of an event or theatrical production to use such a display but to have the display easily removable, for example in between scenes of a play or theatrical event, as the needs of the production dictate. Systems may use a tile based structure where a tile, typically around 2 ft×2 ft, can be lifted by hand and positioned. Accurate positioning of the tiles may be a time consuming and complex process involving skilled personnel.

Displays of these types may be constructed at different resolutions where the spacing between the light emitting elements can be varied. It may also be a requirement to change this spacing at different points on the display. Such systems are disclosed in U.S. Pat. Nos. 5,410,328, 7,102,601 and 7,071,620, the disclosures of which are incorporated by reference herein for all purposes. Further prior art systems, such as the VersaPixel manufactured by Element Labs, Inc. or the MiSphere system manufactured by Barco, may use suspended light emitting elements to be used as a ceiling or roof to an area. It would be advantageous to have a support and installation structure for such displays that is simple to install and that facilitates use in differing resolutions and on different planes through a single structure.

Small errors in the positioning of the pixels within tiles and tiles within a display can be cumulative and may lead to large errors in overall pixel alignment accuracy. At the same time the display support system must be strong enough to support a large area of display tiles and to withstand side loads from wind and weather if used outside. The goal of simultaneous strength, rigidity and accuracy is one that is commonly not achieved in prior art systems and the user typically has to accept a reduced accuracy in order to achieve the required strength. Accordingly, there exists a need for a display system that may be easily installed and/or reconfigured while retaining both strength and positional accuracy.

DETAILED DESCRIPTION OF THE INVENTION

Figure 1:
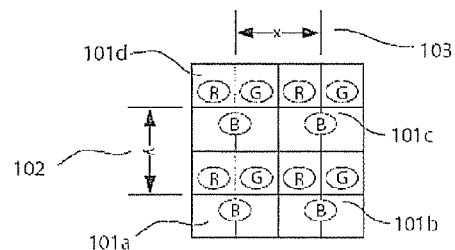
FIG. 1 shows pixels of a prior display system.

FIG. 1 shows pixels of a display system in accordance with the prior art. Each pixel 101a, 101b, 101c, 101d may be constructed from three LEDs; e.g., red (R), green (G) and blue (B). The distance 103 and 102 between the center of a pixel and its adjacent pixels is referred to as the pixel pitch. The x-axis pixel pitch 103 may be substantially the same as the y-axis pixel pitch 102.

In a large display with a large number of pixels it is critical that the pixel pitch is controlled within tight tolerances. Errors in the pixel pitch across the display are very apparent to the viewer and adversely affect the image quality.

Figure 2:
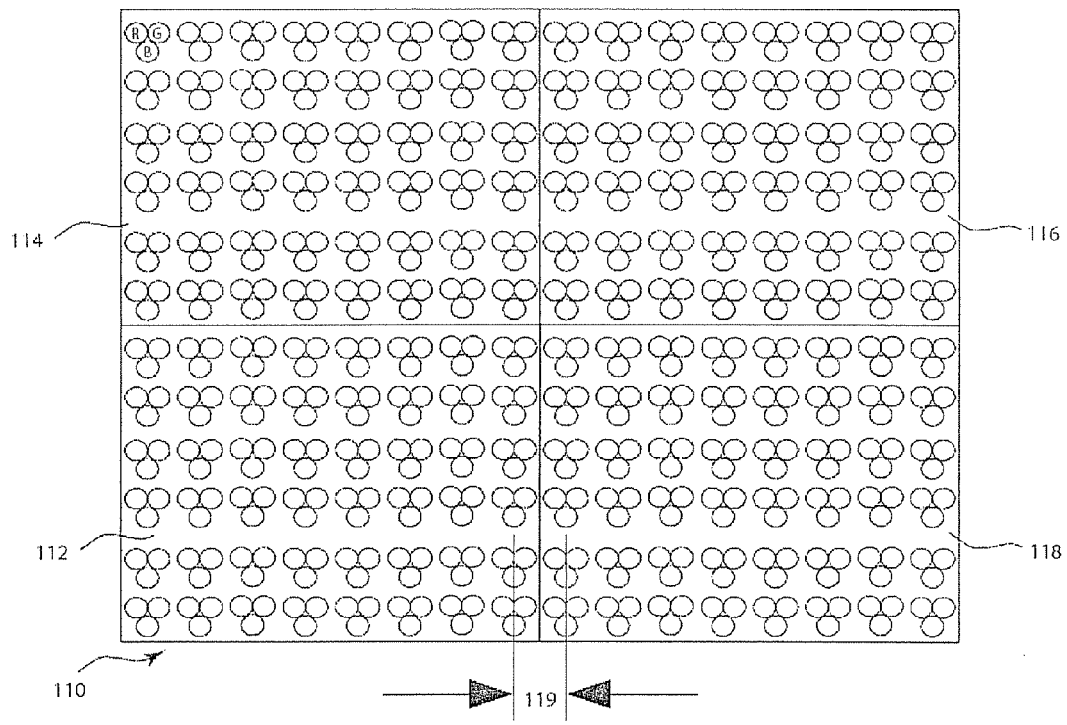
FIG. 2 shows a portion of a prior modular display system.

FIG. 2 illustrates a portion of a modular display system 110 in accordance with the prior art, where display modules 112, 114, 116, 118 are mounted adjacent to each other to form a single display. Methods to control pixel alignment and pitch within a single module are well known in the art through such means as accurate component placement on a printed circuit board within the module housing. The modules may be constructed from plastic, and be sufficiently small that the tolerances within the modules can be tightly controlled.

However the pitch 119 between the pixels on adjacent modules is controlled by the accurate mechanical alignment and spacing of the individual modules. If this alignment and spacing is not accurately maintained gaps may appear in the display which appear darker when the screen is set to black. Additionally, banding can appear due to perceived luminance errors. For example, if the pixel pitch between modules is greater than the pixel pitch within the module, then the effective area subtended to the viewer by the pixels at the boundary is larger than those within the module. This increased effective area causes the perceived luminance of the pixels at the boundaries of the modules to be lower than the pixels within the module causing an apparent band or stripe in the image.

In the prior art, modular display systems may include a number of display modules mounted onto a larger tile in which these tiles are connected together to form the entire screen. The tiles are typically constructed from folded sheet metal, and are large compared to the modules. These tiles and their interconnection provide both the alignment of the display modules and the structural support and strength to form the mechanical infrastructure of the screen. If a screen is intended for an outdoor application then it must further be able to withstand wind loadings producing significant sideways forces.

Figure 3:
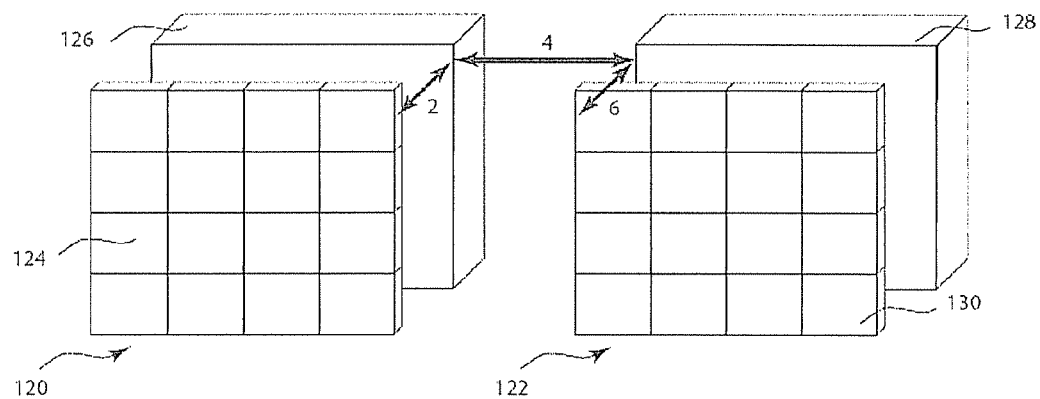
FIG. 3 shows a prior modular display system.

FIG. 3 shows a modular display system in accordance with the prior art. A plurality of display modules 124 are assembled onto a support structure 126 to form tile 120, and a second plurality of display modules 130 are assembled onto support structure 128 to form a second tile 122. Support structures 126 and 128 are interconnected to support and align the two tiles. The alignment of the display modules 124 on tile 120 with display modules 130 on tile 122 are affected by multiple and cumulative tolerances: tolerance 2 between tile 120 and support structure 126, tolerance 4 between support structure 126 and support structure 128, and tolerance 6 between support structure 128 and tile 122.

In the prior art system such tolerances may accumulate and produce a total positional error as high as ±8.25 percent (total 16.5 percent) resulting in visible and objectionable luminance difference between the pixels at the tile boundaries and the pixels within the tile. Such a gap between tiles will be noticeable to an observer and detract from a cohesive look. Although here we are referring to tolerances in a single axis, it is also important to note that these tolerances may be present and important in all three perpendicular axes x, y, and z.

The prior art uses the support structure 126, 128 to provide both:
alignment—ensuring that the tiles align to form a cohesive display; and
structural support—ensuring that the screen can support itself safely as well as endure additional forces, such as from wind loading in outdoor situations.

Alignment accuracy is the primary requirement for display quality, but the large structural parts needed to simultaneously achieve the strength goals may hinder that accuracy. Achieving the tight tolerances needed with large structural components can be difficult and expensive, and almost always involves large amounts of time consuming and expensive machining.

Figure 4:
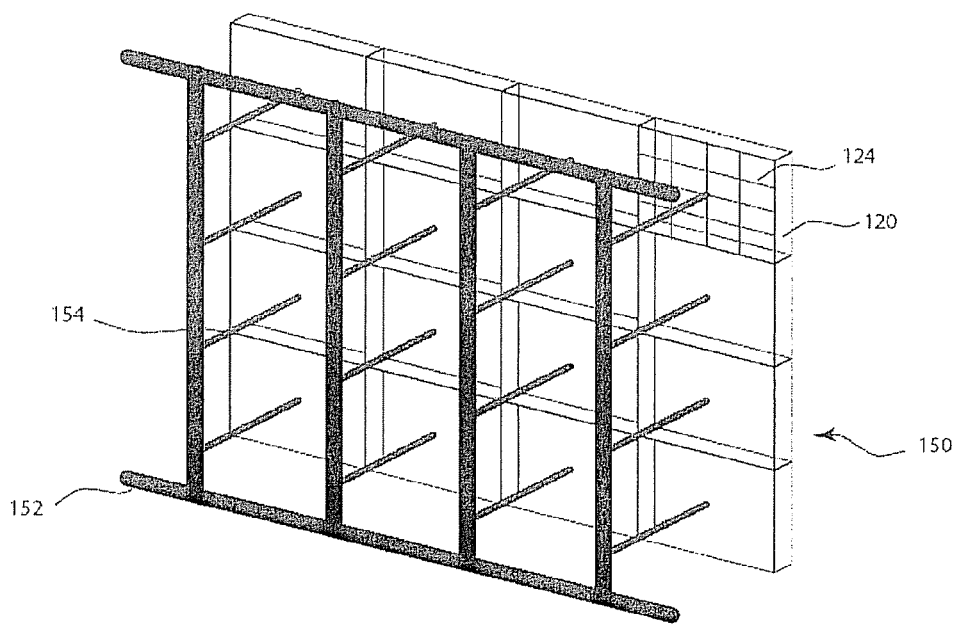
FIG. 4 shows a display system in accordance with embodiments of the present disclosure.

The present disclosure improves on the prior art and discloses means for assembling a modular display which isolate the alignment and structural requirements/functionality from each other. FIG. 4 shows a display system 150 in accordance with embodiments of the present disclosure. Multiple display modules 124 are assembled onto a plurality of tiles 120 (without the use of support structures 126, 128). Tiles 120 may connect to adjacent tiles through at least one connection that may include clips or clamps which provide accurate and improved alignment without having a requirement (or a substantially low requirement) to provide support or strength to the system. Substantially removing the strength requirement from these components allows smaller, more accurately manufactured parts to be used and ensure highly accurate alignment. The tiles may be manufactured using injection molding or other techniques well known in the art which have inherently high levels of accuracy, as compared to the sheet metal and machining techniques used in the prior art. Thus, the video display will be accurately aligned and cohesive in its appearance.

Structural support and strength is provided though a secondary structural support 152 which is connected to the display tiles through attachment member 154 such that the alignment of the display tiles remains uncompromised. In one example, attachment member 154 includes an interconnecting member, such as a rod, and a spigot at the end of the rod, which operably couples to a tile 120. The secondary structural support 152 provides the strength required to support itself and the display tiles and to resist other applied forces such as wind loading.

To ensure that any inaccurate alignment of structural support 152 does not compromise or affect the alignment of the display tiles 120, the attachment members 154 may be constructed so as to take up or nullify any tolerance difference between the accurately aligned display tiles 120 and the structural support 152. Alignment accuracies up to an order of magnitude better than the prior art system can be provided by the separation of the functions of alignment and support. For example, in one embodiment, the attachment member 154 may be moveable or deformable in any direction with respect to the structural support 152.

Figure 5:
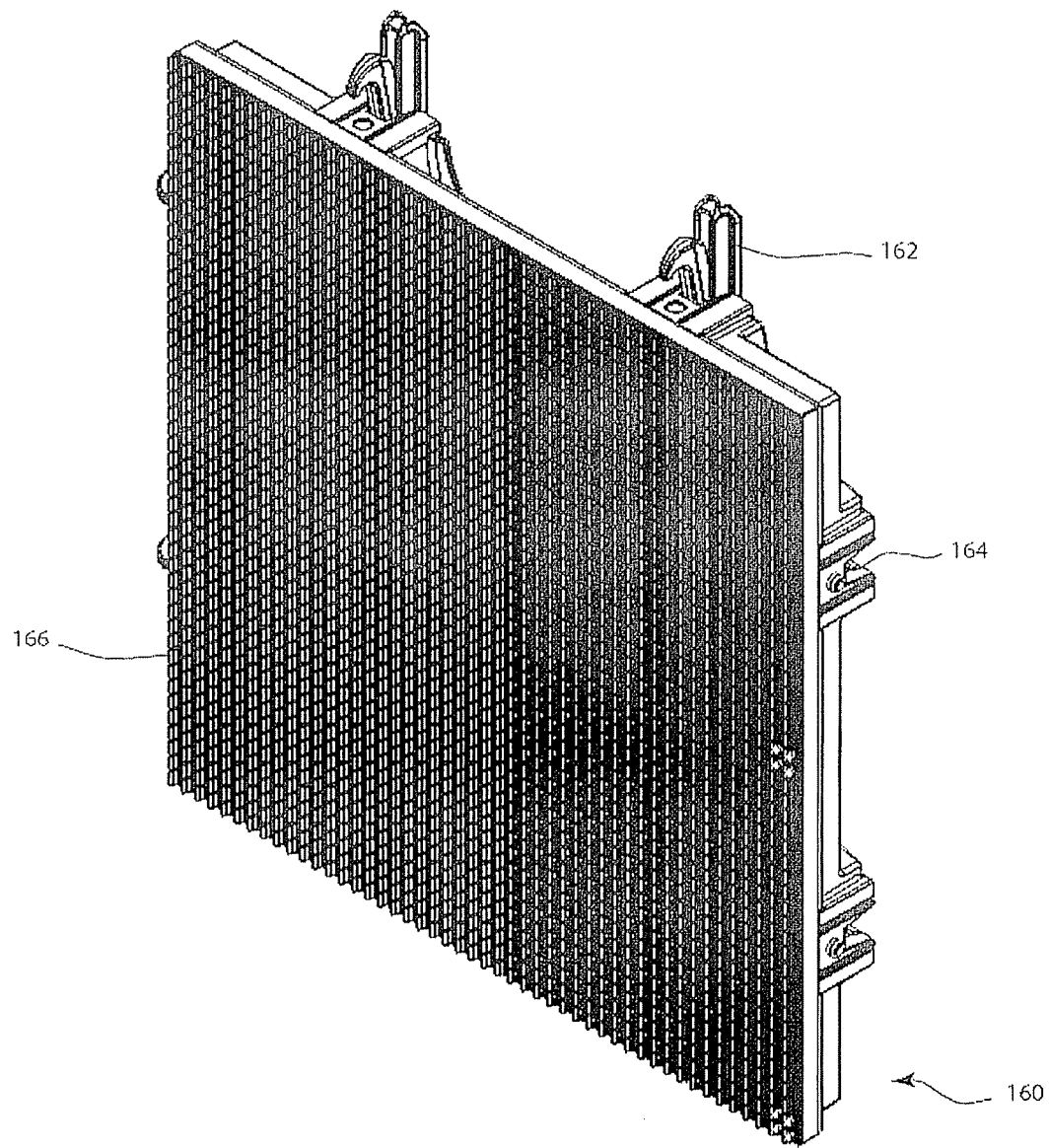
FIG. 5 shows an isometric view of a tile of a display system in accordance with embodiments of the present disclosure.

FIG. 5 shows an isometric view of a tile 160 of a display system in accordance with embodiments of the present disclosure. A plurality of pixels 166 are mounted onto a display tile 160. Display tile 160 is accurately constructed to very tight tolerances and may use injection molding or other inherently accurate manufacturing technique. The strength requirement for tile 160 is minimal, as it only needs to support itself and the attached pixels and associated circuitry. There is no requirement to provide support for adjacent tiles. Alignment between adjacent tiles 160 is provided through connections such as clips 162 and receptacles 164 in one example. Clips 162 and receptacles 164 provide highly accurate alignment of adjacent tiles 160 with no or a substantially low requirement to transmit support or strength between those tiles. This allows the use of accurate construction to very tight tolerances which may use injection molding or other inherently accurate manufacturing technique.

Figure 6:
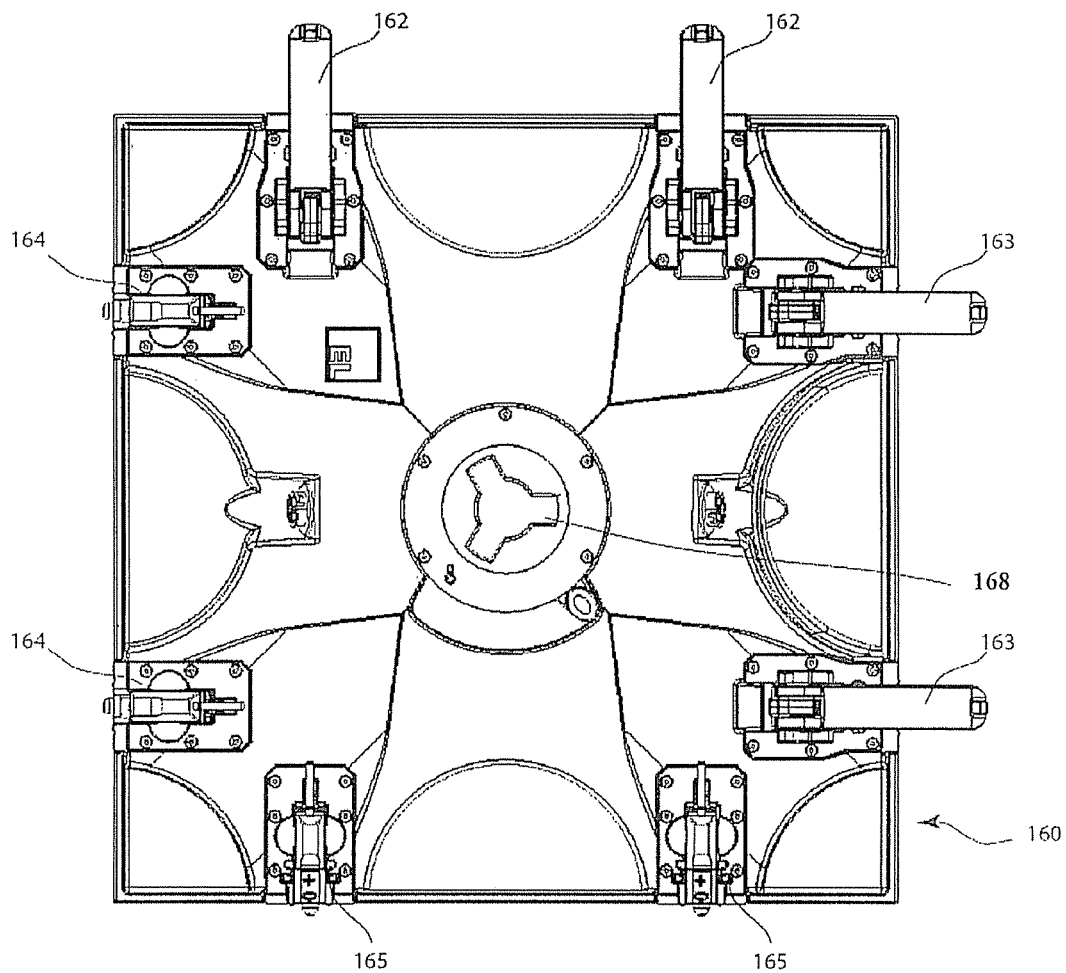
FIG. 6 shows a rear view of a tile of a display system in accordance with embodiments of the present disclosure.

FIG. 6 shows a rear view of a tile of a display system in accordance with embodiments of the present disclosure. Clips 162 on the top of a tile may connect to receptacles 165 on the bottom of the adjacent tile. Similarly clips 163 on the right of a tile may connect to receptacles 164 on the left side of the adjacent tile. Strength and support for tile 160 is provided through center attachment point 168 which connects to the attachment member 154 (FIG. 4) back to the structural support 152 (FIG. 4). Through such means a modular display of any size may be quickly and accurately constructed.

In certain embodiments, the tiles (e.g., tiles 120 or 160) may include a Printed Circuit Board (PCB) that allows a plurality of light emitting elements to be electronically connected to the tile. Further, in certain embodiments, the display system 150 (FIG. 4) may also include a power unit and/or a main processor that is electronically connected to the plurality of light emitting elements. As such, the power unit and/or the main processor may send a data and/or power signal to the plurality of light emitting elements disposed on the tiles. Based on the power signal, the plurality of light emitting elements may be selectively powered on and off or emit light with varying intensities, and based on the data signal, the plurality of light emitting elements may selectively emit light of different colors.

Advantageously, the present disclosure provides a comprehensive display system and support structure capable of providing both strength and rigidity while also presenting a high level of accuracy for tile and pixel placement.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:
1. A display system comprising:
a support structure having a plurality of attachment members; and a plurality of tiles, each tile comprising a plurality of pixels positioned on a visual display side of the tile, wherein each pixel comprises at least three light emitting diodes that emit at least three different colors of light, and each tile of the plurality of tiles is respectively attached to a corresponding attachment member of the plurality of attachment members, each of the attachment members of the support structure comprises a rod that is coupled to a back side of one of the tiles and the rods position the tiles in a array, each of the back sides of each of the tiles is an opposite side of the tile with respect to the visual display side of the tile, each of the rods is substantially transverse to the back side of the tile that the rod is coupled to, and the support structure is configured to structurally support each of the plurality of tiles and at least one tile of the plurality of tiles is removable from the support structure.

2. The system of claim 1 wherein at least one of the plurality of tiles includes at least one connection configured to removably connect and align the at least one of the plurality of tiles with another one of the plurality of tiles.

3. The system of claim 1 wherein the plurality of tiles includes a first tile held at a first angle with respect to the support structure and a second tile held at a second angle with respect to the support structure, different than the first angle.

4. The system of claim 1 wherein the back side comprises at least one connection, extending outward from the back side.

5. The system of claim 1 wherein at least one of the plurality of tiles can be rotated three-hundred and sixty degrees with respect to the support structure.

6. The system of claim 1 wherein the support structure is separable from the plurality of tiles.

7. The system of claim 1 wherein the support structure includes a bar, removably coupled to at least three tiles of the plurality of tiles.

8. The system of claim 1 wherein the plurality of tiles forms a video display.

9. The system of claim 2 wherein each of the connections of each of the tiles comprises a plurality of slots and a central opening, and the slots of each of the connectors extend away from the central opening of the connector.

10. The system of claim 9 wherein each of the pluralities of slots comprises three slots that are positioned in a substantially triangular arrangement, and each of the slots is substantially rectangular.

11. The system of claim 2 wherein the rods are substantially parallel.

12. A method of constructing a display system comprising:
providing a support structure comprising a plurality of rods;
providing a plurality of tiles, wherein the plurality of tiles comprises a plurality of pixels, each pixel includes a plurality of light-emitting elements disposed on a surface of each tile of the plurality of tiles; and
coupling the plurality of tiles to the plurality of rods of the support structure, wherein each rod is substantially transverse to a back side of one of the tiles that the rod is coupled to,
the rods position the tiles in an array, and
the coupled plurality of tiles can be rotated while attached to the support structure.

13. The method of claim 12 wherein the support structure comprises a plurality of support bars that are coupled to the rods.

14. The method of claim 12 wherein each tile of the plurality of tiles comprises at least one connection coupled to one other tile of the plurality of tiles.

15. The method of claim 12 wherein the support structure comprises a plastic material.

16. The method of claim 12 comprising removing the coupled plurality of tiles from the support structure.

17. A system comprising:
a plurality of tiles, each tile comprising a plurality of pixels positioned on a light emitting side of the tile, wherein each pixel comprises a plurality of light emitting diodes and the light emitting diodes of each pixel emit at least three different colors of light; and a connector positioned on non-light emitting side of the tile, wherein each of the connectors comprises a plurality of slots and a central opening, the slots of each connector connect with the central opening of the connector and extend away from the central opening of the connector, and the light emitting side and the non-light emitting side of each tile are opposite sides of the tile;
a plurality of alignment connections, each alignment connection comprising a plurality of clips and a plurality of receptacles, wherein each tile of the plurality of tiles includes at least one alignment connection positioned on a back side of the tile and the clips and a plurality of receptacles of each alignment connection are used to align a first tile with a second tile of the plurality of tiles, and each of the back sides of each tile is an opposite side of the tile with respect the light emitting side of the tile; and
a support structure comprising a plurality of rods wherein the first tile of the plurality of tiles is coupled to a first rod of the support structure,
the second tile of the plurality of tiles is coupled to a second rod of the support structure;
the first rod is substantially transverse to the back side of the first tile,
the second rod is substantially transverse to the back side of the second tile, and
the first and the second rods are substantially parallel and couple the first and the second tiles adjacently.

18. The system of claim 17 wherein the plurality of alignment connections are not coupled to the support structure.

19. The system of claim 17 wherein the support structure extends in a substantially vertical orientation and substantially horizontal orientation with respect to the back sides of the tiles.

20. The system of claim 17 wherein each of the plurality of slots comprises three slots.

21. The system of claim 20 wherein the three slots of each tile are positioned in a substantially triangular arrangement and each of the slots is substantially rectangular.

22. The system of claim 12 wherein each tile comprises a connector positioned on the back side of the tile, each of the connectors comprises a plurality of slots and a central opening, and the slots of each connector extend away from the central opening of the connector.

23. The system of claim 22 wherein each of the plurality of slots comprises three slots that are positioned in a substantially triangular arrangement.

24. The system of claim 22 wherein each of the slots is substantially rectangular.

* * * * *